(12) United States Patent  
Toizumi et al.

(10) Patent No.: US 8,520,227 B2  
(45) Date of Patent: Aug. 27, 2013

(54) PRINTING SYSTEM

(75) Inventors: Tomoko Toizumi, Osaka (JP); Masanori Matsumoto, Osaka (JP); Tsutomu Yoshimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 234 days.

(21) Appl. No.: 12/806,616

(22) Filed: Aug. 17, 2010

(65) Prior Publication Data

US 2011/0051164 A1    Mar. 3, 2011

(30) Foreign Application Priority Data

Aug. 25, 2009  (JP) ................................. 2009-194047

(51) Int. Cl.
- *G06F 3/12* (2006.01)
- *G06F 3/048* (2013.01)
- *H04N 1/60* (2006.01)
- *G03G 15/08* (2006.01)
- *G03G 15/00* (2006.01)

(52) U.S. Cl.  
USPC ............ 358/1.13; 358/1.9; 358/1.15; 399/53; 399/81; 715/809

(58) Field of Classification Search  
None  
See application file for complete search history.

(56) References Cited

U.S. PATENT DOCUMENTS

| | | | | |
|---|---|---|---|---|
| 5,579,446 | A * | 11/1996 | Naik et al. | 358/1.9 |
| 7,565,088 | B2 * | 7/2009 | Shibasaki | 399/81 |
| 8,031,365 | B2 * | 10/2011 | Oka | 358/1.9 |
| 2002/0071689 | A1 * | 6/2002 | Miyamoto | 399/53 |
| 2005/0138573 | A1 * | 6/2005 | Mathieson | 715/809 |
| 2007/0115502 | A1 | 5/2007 | Sato | |
| 2008/0037058 | A1 * | 2/2008 | Ban | 358/1.15 |

FOREIGN PATENT DOCUMENTS

| | | |
|---|---|---|
| CN | 1972350 A | 5/2007 |
| JP | 2003-260857 A | 9/2003 |
| JP | 2005-217878 A | 8/2005 |
| JP | 2007-034533 A | 2/2007 |
| JP | 2008-117128 | 5/2008 |

* cited by examiner

*Primary Examiner* — Marivelisse Santiago Cordero  
*Assistant Examiner* — Brett Gardner  
(74) *Attorney, Agent, or Firm* — Edwards Wildman Palmer LLP; George W. Neuner

(57) ABSTRACT

A printing system according to this invention includes a display, a storage section, a determination section, and a control section. The display is capable of displaying an ECO mode recommending screen which recommends a plurality of ECO modes for selection. The storage section is configured to store therein a characteristic of a printing data item unsuited for ECO mode printing. The determination section is configured to determine whether or not a printing data item is suited for the ECO mode printing. The control section causes the display section to display the ECO mode recommending screen in response to a determination made by the determination section that the printing data item is suited for the ECO mode printing and then start a printing process in response to a printing instruction given by a user.

5 Claims, 16 Drawing Sheets

FIG. 2

PRINTING

Printer
- Printer name(N): SHARP MX-4101FN SPDL2-c_ECO ▶ | Property(P)
- State: idling
- Type: SHARP MX-4101FN SPDL2-c_ECO
- Place: IP_10.36.102.30
- Comments:

☐ Output to file(L) ... Retrieve printer(D)...
☐ Hand-feed double-side printing(X)

Printing range
- ● All(A)
- ○ Present page(E)    ○ Selected part(S)
- ○ Page specification(G):
Specify either page numbers with commas like 1, 3, 6 or a page range like 4 - 8.

Number of printed copies
Number of copies(C): 1
☑ Printing of each copy(T)

Printed object(W): document ▶
Print specification(R): all pages ▶

Scaling
Number of pages per sheet(H): 1 page ▶
Paper size specification(Z): no scale factor specification ▶

Options(O)...    Eco display setting    OK    Close

PRINTING SYSTEM

CROSS REFERENCE

This Nonprovisional application claims priority under 35 U.S.C. §119(a) on Patent Application No. 2009-194047 filed in Japan on Aug. 25, 2009, the entire contents of which are hereby incorporated by reference.

BACKGROUND OF THE INVENTION

The present invention relates to a printing system for controlling a printing process performed by an image forming apparatus.

In printing using an image forming apparatus such as a printer, a copier or a facsimile apparatus, an information processing device connected to the image forming apparatus prepares a printing data item for forming an image and then issues a printing instruction to the image forming apparatus. In response to the printing instruction, the image forming apparatus performs printing according to settings related to the type of printing sheets to be used, a printing mode and the like which are designated by the user on a screen provided by a printer driver installed in the information processing device.

From the viewpoint of global environmental protection focused in recent years, there is an increasing demand for saving resources including printing media indicative of printing paper, printing toner and ink when printing is performed using image forming apparatuses. The functions of image forming apparatuses include those functions which can foster the resources saving by reducing the number of printing sheets to be used, such as a double-sided printing function for printing images on both sides of a printing sheet, and an aggregate printing function for printing a plurality of images on one printing sheet by scaling the images down. An image forming apparatus of the type having a color printing function can reduce the amount of consumption of coloring material, such as color ink and color toner, by printing a color image data item of less importance as an achromatic image, thereby making it possible to save resources.

In recent offices, an unspecified number of users connected to a network use image forming apparatuses connected to the network. These image forming apparatuses are managed by a specific manager. However, it is difficult for the manager to check the state of use on a user-by-user basis and urge each user to save resources as intended by the manager.

In view of this difficulty, an apparatus is disclosed which is configured such that when an image forming condition preset on the image forming apparatus side is different from an image forming condition transmitted from the information processing device, the image forming apparatus compares the two image forming conditions to each other, transmits a message corresponding to an inconsistent condition to the information processing device, and automatically informs the user of an image forming condition recommended by the image forming apparatus, thereby making it possible to urge the user to save resources as intended by the manager (see Japanese Patent Laid-Open Publication No. 2005-217878 for example).

The apparatus disclosed in Japanese Patent Laid-Open Publication No. 2005-217878 involves a problem that a user who uses printing data items unsuited for printing using a resources saving function is imparted with a sensation of troublesomeness because such a user is informed of a recommended condition every time the user gives a printing instruction.

In view of the foregoing problem, a feature of the present invention is to provide a printing system which is capable of urging users to save resources without imparting a sensation of troublesomeness to a user who uses printing data items unsuited for printing using the resources saving function.

SUMMARY OF THE INVENTION

A printing system according to the present invention has a plurality of ECO modes each provided for printing with a reduced amount of usage of at least one of printing media indicative of printing sheet, printing toner and ink. The "ECO modes" are ecological modes indicative of printing sheet saving modes, including N-up printing (N is an integer of not less than 2) and double-sided printing for example, and coloring material saving modes, including a mode for switching color printing to achromatic printing. The "N-up printing" is a mode for printing data in an amount of N pages on one side of a printing sheet.

The printing system according to the present invention comprises a display section, a storage section, a determination section, and a control section. The display section is capable of displaying an ECO mode recommending screen which recommends the plurality of ECO modes for selection. The storage section is configured to store therein a characteristic of a printing data item unsuited for ECO mode printing. The determination section is configured to determine whether or not a printing data item is suited for the ECO mode printing based on information stored in the storage section. The control section is configured to control the printing system based on a result of determination made by the determination section. The control section causes the display section to display the ECO mode recommending screen in response to a determination made by the determination section that the printing data item is suited for the ECO mode printing and then starts a printing process in response to a printing instruction given by a user, while, in response to a determination made by the determination section that the printing data item is unsuited for the ECO mode printing, starting the printing process without the display section displaying the ECO mode recommending screen.

The foregoing and other features and attendant advantages of the present invention will become more apparent from the reading of the following detailed description of the invention in conjunction with the accompanying drawings.

BRIEF DESCRIPTION OF THE DRAWINGS

FIG. 2 is a view illustrating a print window displayed by a printer driver of the printing system according to the first embodiment of the present invention;

DETAILED DESCRIPTION OF THE INVENTION

Hereinafter, a printing system according to an embodiment of the present invention will be described in detail with reference to the drawings.

Figure 1:
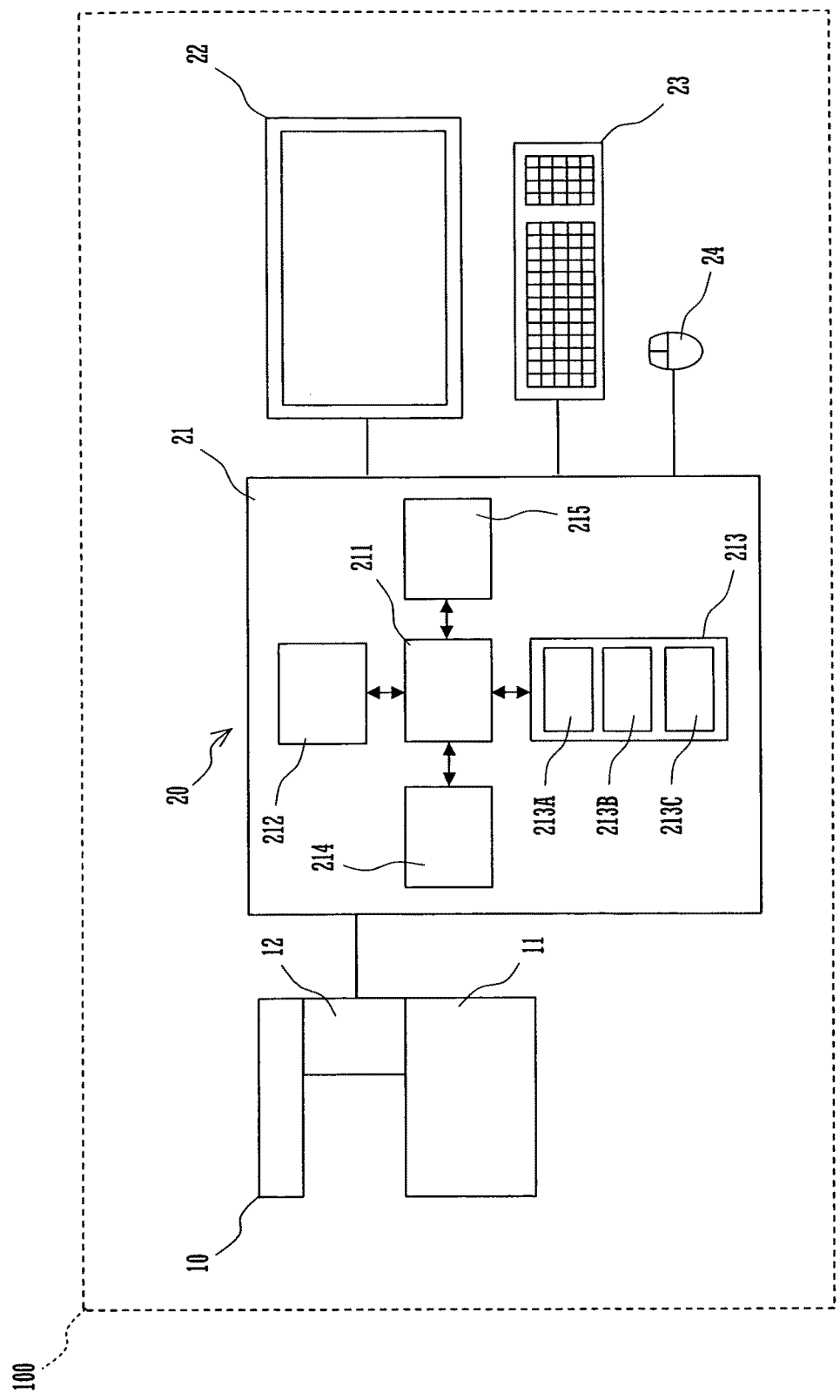
FIG. 1 is a diagram illustrating a configuration of a printing system according to a first embodiment of the present invention.

As shown in FIG. 1, a printing system 100 according to a first embodiment of the present invention comprises a printer 10 and an information processing device 20 which are connected to each other.

The printer 10 includes a sheet feeding section 11 and an image forming section 12. The printer 10 feeds a printing sheet, such as a plain paper sheet or a developing paper sheet, from the sheet feeding section 11 to the image forming section 12 and then performs printing based on a printing data item at the image forming section 12 to form a color or achromatic image on the printing sheet. For instance, the printer 10 is a multi-functional apparatus configured to perform electrophotographic printing. The printer 10 has a plurality of ECO modes each provided for printing with a reduced amount of usage of at least one of printing media indicative of printing sheet, printing toner and ink. The "ECO modes" are printing modes for N-up printing (N is an integer of not less than 2) and achromatic printing for example. The "N-up printing" is printing of data in an amount of N pages on one side of a printing sheet. The type of printing to be performed by the printer 10 may be selected from a plurality of types irrespective of the electrophotographic printing, ink jet printing or other type of printing.

The information processing device 20, which is a personal computer for example, includes a main body 21, a display 22, a keyboard 23, and a mouse 24. The display 22 is equivalent to the display section defined by the present invention. The main body includes a control section 211, a storage section 212, a program storage section 213, a determination section 214, and a management section 215.

The control section 211 is connected to the display 22, keyboard 23 and mouse 24. The printer 10 is connected to the control section 211 either via a network or directly.

Figure 7:
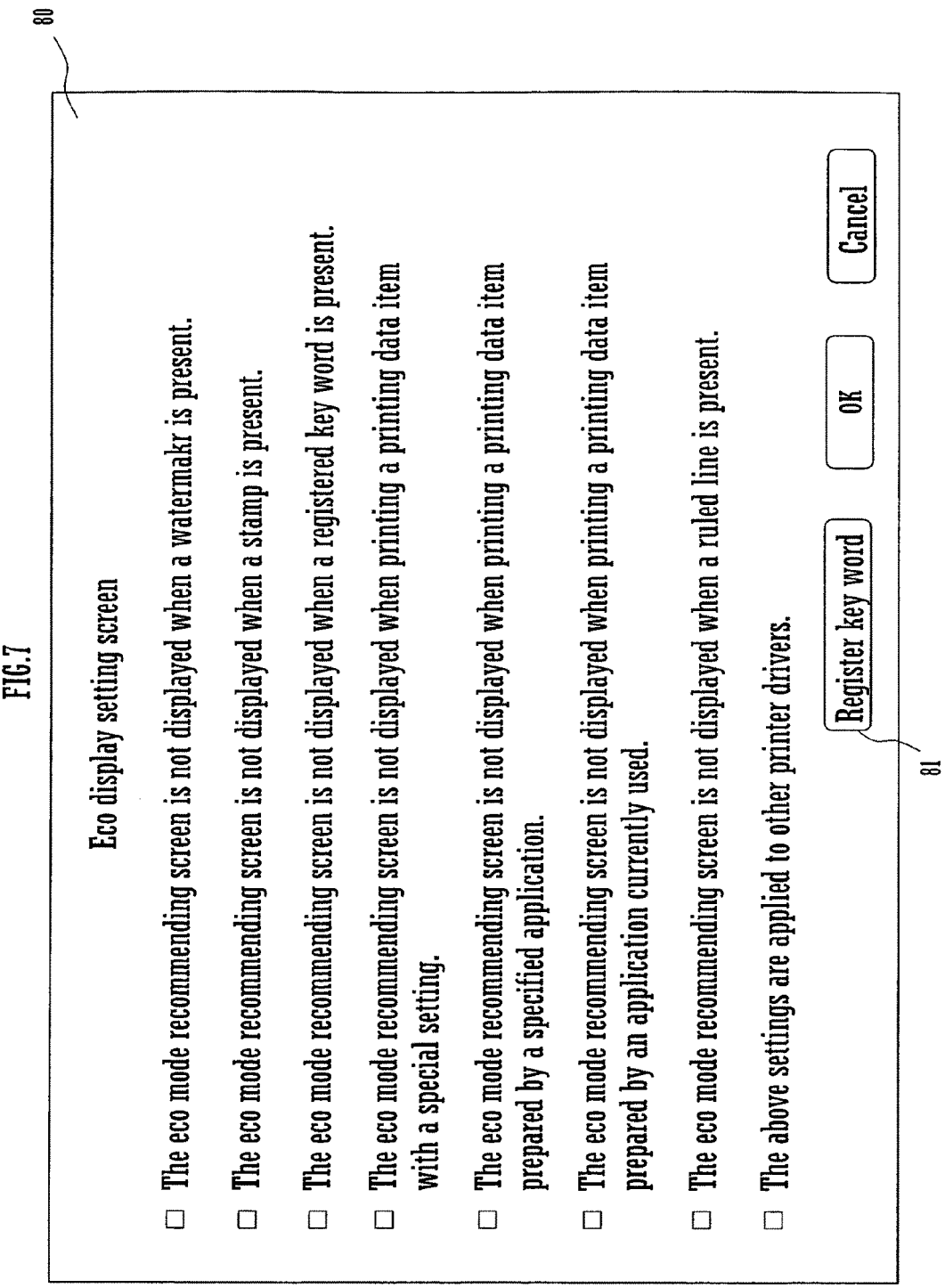
FIG. 7 is a view illustrating an ECO display setting screen displayed on the display section of the printing system according to the first embodiment of the present invention.

The storage section 212 is configured to store therein a characteristic of a printing data item unsuited for ECO mode printing. The characteristic of a printing data item unsuited for ECO mode printing indicates, for example, a watermark or a stamp as seen in FIG. 7. Because printing data items each provided with such a watermark or stamp are often official documents, such printing data items are considered to be unsuited for ECO mode printing.

The determination section 214 is configured to determine whether or not a printing data item is suited for ECO mode printing in response to a. printing instruction given to print that printing data item. The determination section 214 searches the printing data item for a specified key word stored in the storage section 212 to determine whether or not the specified key work is present in the printing data item, thereby determining whether or not the printing data item is suited for ECO mode printing.

The management section 215 is configured to manage an ECO contribution degree indicative of a rate of reduction in the amount of usage of printing media at a printing occasion on a user-by-user basis. The management section 215 increases the ECO contribution degree when a printing data item is printed by ECO mode printing in response to a printing instruction to print that printing data item while decreasing the ECO contribution degree when the printing data item is printed by normal printing (1-up single-sided color printing).

The program storage section 213 has installed therein an application program 213A for data preparation, a printer driver 213B for controlling the operation of the printer 10 during printing, and a printing control program 213C, together with an operating system.

The control section 211 operates according to the programs stored in the program storage section 213. The control section 211 prepares image data containing document data based on operation data on the keyboard 23 and the mouse 24 during execution of the application program 213A for data preparation stored in the program storage section 213. The image data thus prepared is converted to display data and then displayed on the display 22 and stored in the storage section 212.

The control section 211 prepares printing data from the image data stored in the storage section 212 based on the operation data on the keyboard 23 and the mouse 24 during execution of the printer driver 213B stored in the program storage section 213. The printing data thus prepared is outputted to the printer 10 via a non-illustrated interface.

When a request for printing is made by a user operating the keyboard 23 or the mouse 24 during execution of the application program 213A, the printer driver 213B starts up to cause the display 22 to display a print window 31 illustrated as an example in FIG. 2.

As shown in FIG. 2, the print window 31 is provided therein with a printer setting zone 311, a print range zone 312, a copies zone 313, a scale up/down zone 314, and the like, together with a print start button 315. The print window 31 is further provided with an ECO display setting button 317 for transition to an ECO display setting screen 80 to be described later.

The print range zone 312 receives entry of designation of a print range in the image data prepared by an application program.

The copies zone 313 receives entry of a specified number of copies of image data in the print range set at the print range zone 312.

The scale up/down zone 314 shows particulars of settings established or calculation results with respect to the number of pages per sheet and a sheet size which form necessary information for determining a magnifying power for an image to be formed on the sheet.

The printer setting zone 311 presents the name of the printer 10 to be used for printing and receives entry of a change of printer when a plurality of printers are present that can be handled by the information processing device 20. The printer setting zone 311 is provided with a properties button 316 for checking the details of setting. When the user selects the properties button 316 by using the mouse 24, the display 22 displays a main setting window 32 shown as an example in FIG. 3.

Figure 3:
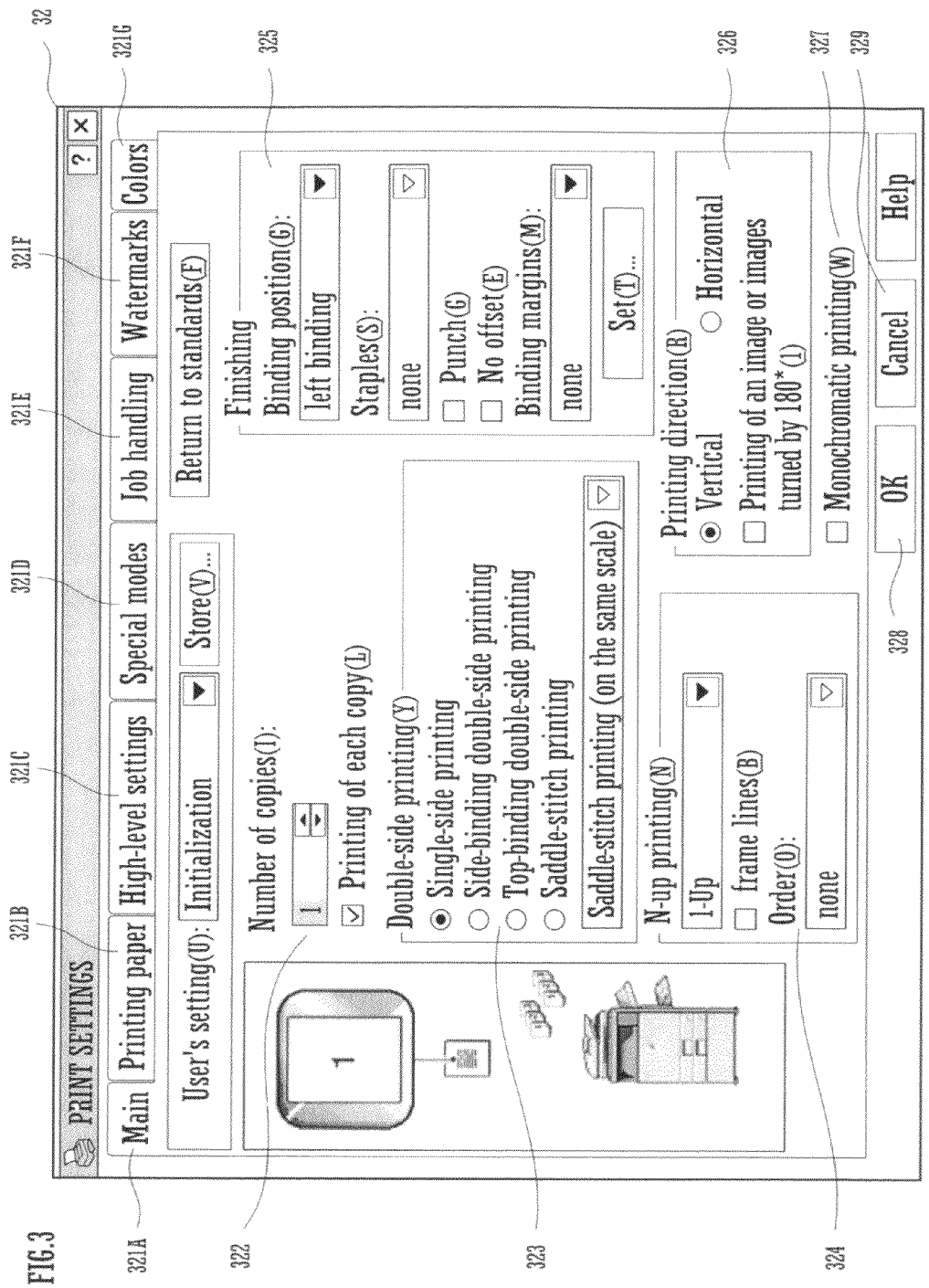
FIG. 3 is a view illustrating an exemplary main setting window displayed by the printer driver of the printing system according to the first embodiment of the present invention.

As shown in FIG. 3, the main setting window 32 is provided with a plurality of tabs 321A to 321G for displaying respective screens each providing information on use or non-use, or particulars of setting with respect to a respective one of available functions of the printer 10 and each capable of receiving entry of a change of setting. For example, the main tab 321A provides a screen having zones 322 to 327, each of which receives entry of a change of setting for a respective one of functions including designation of number of copies, double-sided printing, aggregate printing, finishing, printing orientation and achromatic printing.

In the main setting window 32 there are provided an OK button 328 and a cancel button 329. The OK button 328 receives entry of a definitive changed setting. The cancel button 329 receives entry of cancellation of a changed setting. The OK button 328 and the cancel button 329 are setting completion buttons which are operated when confirmation of a setting and a change of setting have been completed.

Figure 4:
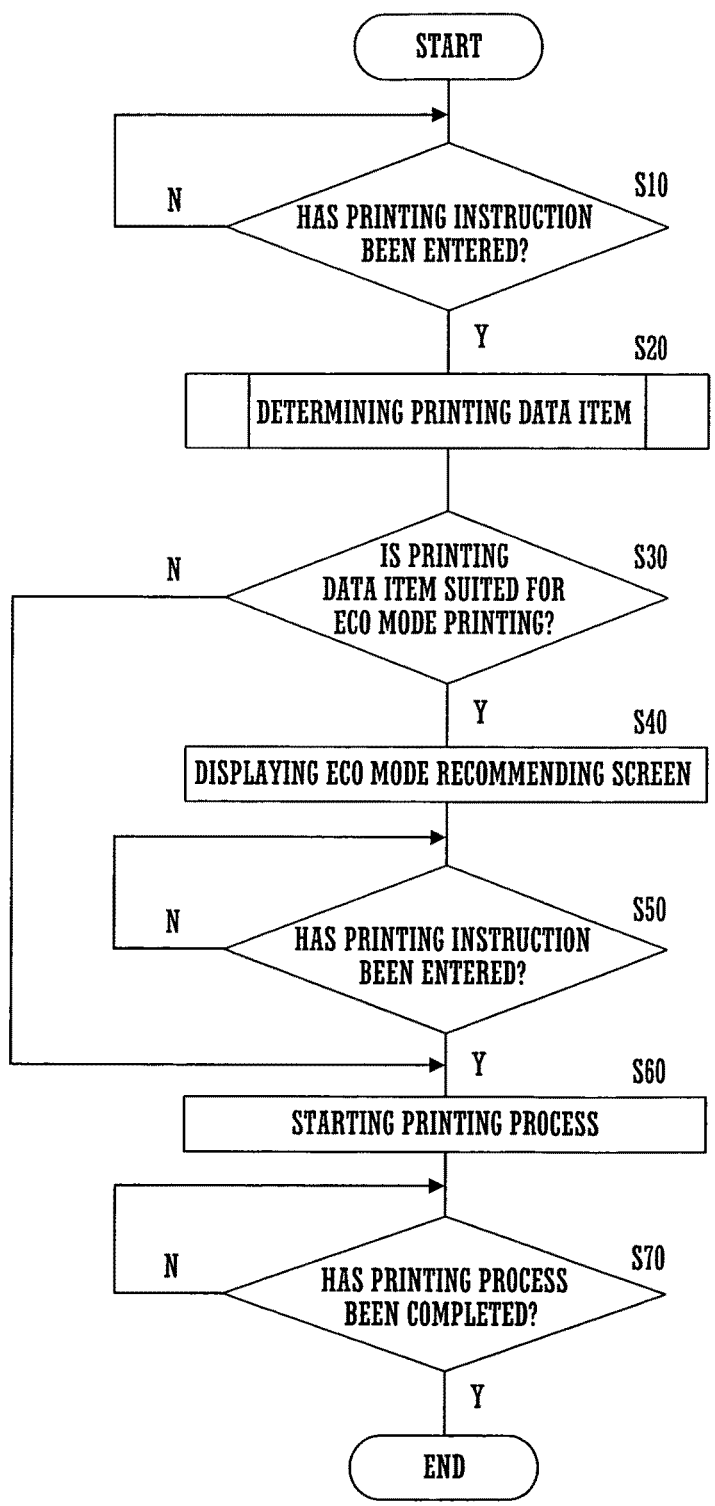
FIG. 4 is a flowchart of a control process carried out for printing a printing data item in the printing system according to the first embodiment of the present invention.

FIG. 4 is a flowchart of a control process carried out for printing a printing data item in the printing system according to the first embodiment of the present invention.

The control section 211 waits for entry of a printing instruction (in the case of NO in step S10). If the control section 211 determines that the entry of the printing instruction has been made (in the case of YES in step S10), the control section 211 causes the determination section 214 to determine whether or not a printing data item specified by the printing instruction is suited for ECO mode printing (step S20).

Figure 5:
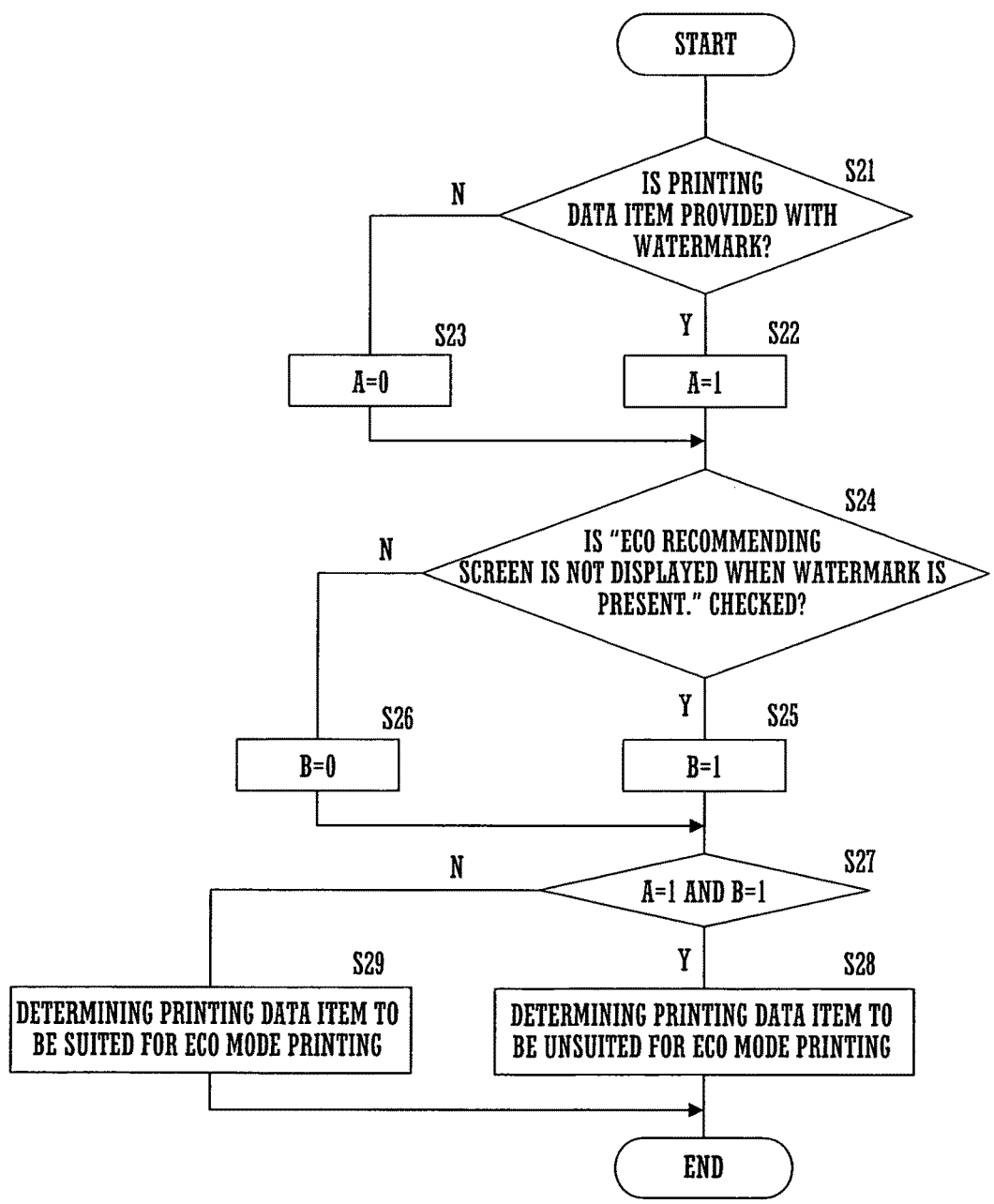
FIG. 5 is a flowchart of a control process carried out for printing a printing data item in the printing system according to the first embodiment of the present invention.

FIG. 5 shows the details of the determination process performed in step S20. FIG. 5 illustrates an exemplary process flow performed when a clause related to a watermark appearing on the ECO display setting screen 80 shown in FIG. 7 is checked.

The control section 211 determines whether or not the printing data item of concern is provided with a watermark (step S21). If it is determined that the printing data item of concern is provided with the watermark (in the case of YES in step S21), the control section 211 causes the storage section 212 to store A=1 (step S22). If it is not determined that the printing data item of concern is provided with the watermark (in the case of NO in step S21), the control section 211 causes the storage section 212 to store A=0 (step S23).

Subsequently, the control section 211 determines whether or not the clause "The ECO recommending screen is not displayed when a watermark is present." appearing on the ECO display setting screen 80 is checked (step S24). If it is determined that the clause is checked (in the case of YES in step S24), the control section 211 causes the storage section 212 to store B=1 (step S25). On the other hand, if it is not determined that the clause of concern is checked, the control section 211 causes the storage section 212 to store B=0 (step S26).

Subsequently, the control section 211 causes the determination section 214 to determine whether or not the printing data item of concern is suited for ECO mode printing (steps S27 to S29). Specifically, the determination section 214 determines whether or not the storage section 212 has stored A=1 and B=1 therein (step S27). If it is determined that the storage section 212 has stored A=1 and B=1 therein (in the case of YES in step S27), the determination section 214 determines that the printing data item of concern is unsuited for ECO mode printing (step S28). On the other hand, if it is not determined that the storage section 212 has stored A=1 and B=1 therein (in the case of NO in step S27), the determination section 214 determines that the printing data item of concern is suited for ECO mode printing (step S29).

Though the determination process in step S20 is directed to the exemplary process flow performed when the clause related to the watermark appearing on the ECO display setting screen 80 is checked, the determination process is not limited to the case where the clause related to the watermark is checked. A process flow similar to the process flow S21 to S29 is applicable to any other clause appearing on the ECO display setting screen 80. The details of the determination process in step S20 are similar to those of a determination process performed in any one of steps S110, S210, S310 and S510 to be described later.

Figure 6:
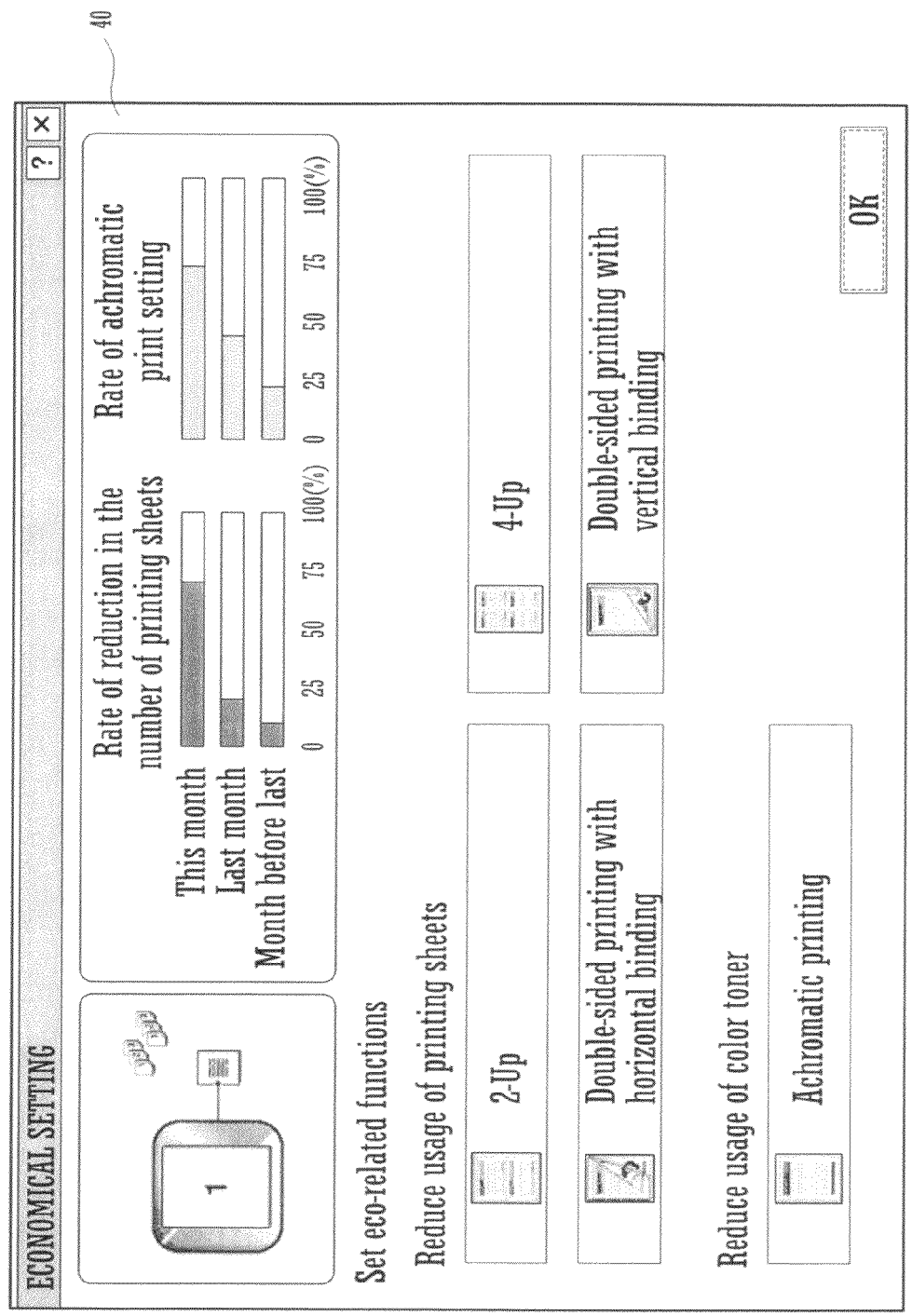
FIG. 6 is a view illustrating an ECO mode recommending screen displayed on a display section of the printing system according to the first embodiment of the present invention.

If the control section 211 determines that the determination section 214 has determined in step S20 that the printing data item of concern is unsuited for ECO mode printing (in the case of NO in step S30), the process proceeds to step S60 without displaying an ECO mode recommending screen 40. On the other hand, if the control section 211 determines that the determination section 214 has determined in step S20 that the printing data item of concern is suited for ECO mode printing (in the case of YES in step S30), the control section 211 causes the display 22 to display the ECO mode recommending screen 40 as shown in FIG. 6 (step S40). The determination in step S30 is based on a plurality of determination criteria appearing on the ECO display setting screen 80 to be described later.

The ECO mode recommending screen 40 is a screen for urging the user to save resources. The ECO mode recommending screen 40 recommends the function of saving printing sheets and the function of saving color toner. The user can contribute to resources saving by selecting these functions. Further, the ECO mode recommending screen 40 presents data on the degree of contribution to ecology (ECO contribution degree) managed by the management section 215. The data on the ECO contribution degree allows the user to start being strongly conscious of resources saving.

After step S40, the control section 211 waits until the user enters a printing instruction (in the case of NO in step S50). If the control section 211 determines that the printing instruction has been entered (in the case of YES in step S50), the control section 211 starts printing the printing data item (step S60). Here, printing is performed under initial setting conditions when the print setting conditions have not been changed during displaying of the ECO mode recommending screen 40. On the other hand, when the print setting conditions have been changed during displaying of the ECO mode recommending screen 40, printing is performed under the changed print setting conditions. Thereafter, the control section 211 waits until the printing of the printing data item is completed (in the case of NO in step S70). If the control section 211 determines that the printing of the printing data item has been completed (in the case of YES in step S70), the control section 211 terminates the control process according to the present embodiment.

The present embodiment is configured to determine whether or not the printing data item specified by the printing instruction is suited for ECO mode printing and then determine whether or not to display the ECO mode recommending screen 40. For this reason, the present embodiment is capable of urging the user to save resources without imparting a sensation of troublesomeness to the user handling a printing data item unsuited for printing using the resources saving function.

FIG. 7 shows a screen for setting determination criteria according to which the determination section 214 determines whether or not a printing data item is suited for ECO mode printing. The ECO mode display setting screen 80 presents the plurality of determination criteria. By checking a check box given to each of the determination criteria, the determination criterion thus checked is utilized for determination of a printing data item. These determination criteria are related to characteristics of respective printing data items. The ECO display setting screen 80 is displayed by selecting an ECO display setting button 317 of the print window 31.

The following description is directed to the determination criteria "The ECO mode recommending screen is not displayed if a watermark is present." and "The ECO mode recommending screen is not displayed if a stamp is present.". The "watermark", as used herein, is meant by a printing character or the like which is not present in a printing data item having been just prepared by an application and which is added to that printing data item by a printer driver. Specific examples of such watermarks include letters, such as "secret", "duplication strictly forbidden", "absolutely confidential", "important", "circulation", and "urgent", and characters such as a company's logo. A printing data item provided with such a watermark or a stamp is often an official printing data item rather than a printing data item to be printed personally by the user and hence is unsuited for ECO mode printing in most cases. Therefore, by checking the check box for each of these determination criteria, the user can avoid feeling the troublesomeness that the ECO mode recommending screen 40 is undesirably displayed when printing a printing data item provided with the watermark or stamp.

Figure 8:
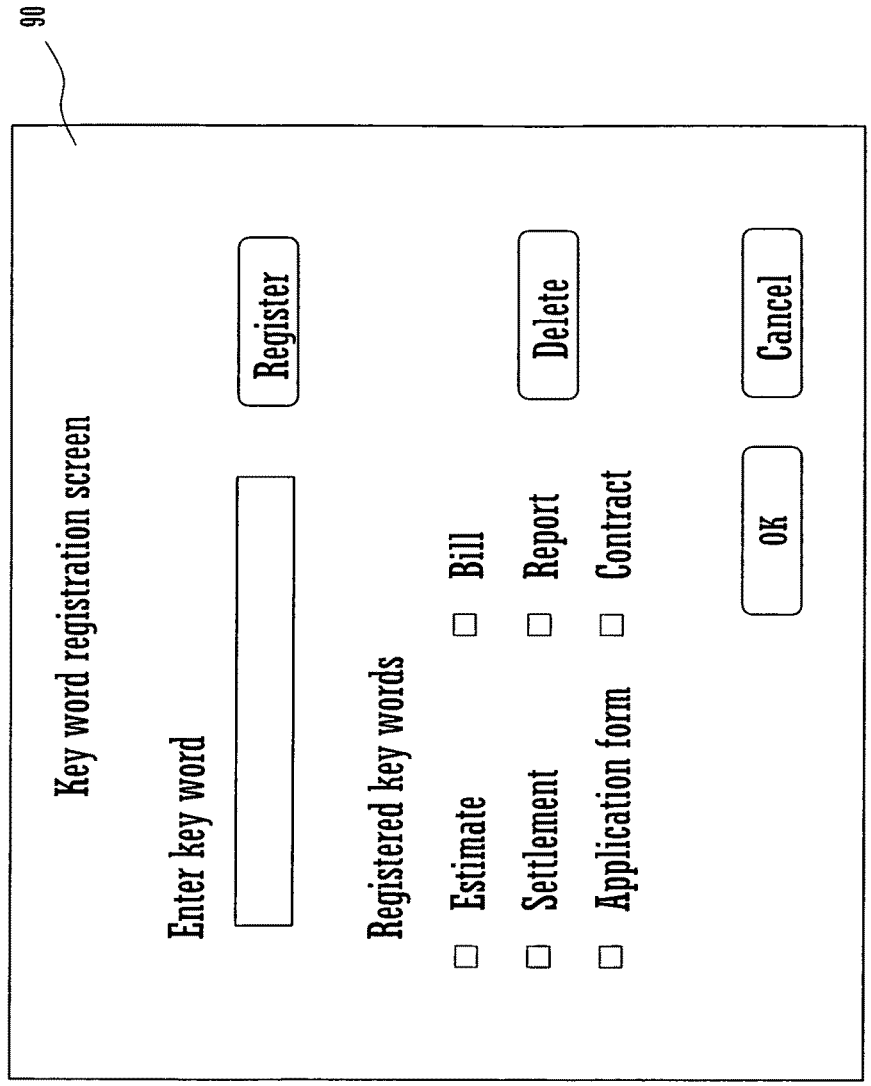
FIG. 8 is a view illustrating a key word registration screen displayed on the display section of the printing system according to the first embodiment of the present invention.

The determination criterion "The ECO mode recommending screen is not displayed when a registered key word is present." is described below. As shown in FIG. 8, such registered key words are key words registered on a key word registration screen 90. The user can add a key word and delete a key word registered on the key word registration screen 90. The key word registration screen 90 is displayed by selecting a key word registration button 81 of the ECO display setting screen 80. It is possible to provide a configuration such that the key word registration button 81 appears only when the check box for the determination criterion "The ECO mode recommending screen is not displayed when a registered key word is present." is checked. Here, key words including, for example, an estimate and a settlement are registered. In most cases, the user does not want ECO mode printing of a printing data item containing such a registered key word. Therefore, by checking the check box for this determination criterion, the user can avoid feeling the troublesomeness that the ECO mode recommending screen 40 is undesirably displayed when printing a printing data item provided with such a registered key word.

The determination criterion "The ECO mode recommending screen is not displayed when printing a printing data item with a special setting." is as follows. The "printing data item with a special setting" is meant to include, for example, a printing data item with a header or footer entered, a printing data item containing a logo, a printing data item to be printed on a printing sheet in a specified format, and a printing data item designating a specified sheet cassette. In most cases, these printing data items are unsuited for ECO mode printing (especially N-up printing). Therefore, by checking the check box for this determination criterion, the user can avoid feeling the troublesomeness that the ECO mode recommending screen 40 is undesirably displayed when printing a printing data item with a special setting. It is possible that the registration screen as shown in FIG. 8 is designed to allow registration of a special setting.

The determination criterion "The ECO mode recommending screen is not displayed when printing a printing data item prepared by a specified application." is as follows. Such specified applications include, for example, CAD, Photoshop, Paintshop, and Autosketch. In most cases, printing data items prepared by such applications are unsuited for ECO mode printing because the aesthetical appearance of resulting prints depends upon the image quality. Therefore, by checking the check box for this determination criterion, the user can avoid feeling the troublesomeness that the ECO mode recommending screen 40 is undesirably displayed when printing a printing data item prepared by such a specified application. It is possible that the registration screen as shown in FIG. 8 is designed to allow registration of a specified application. The registration screen thus designed enables the user to register an application easily. It is possible to further provide an additional determination criterion "The ECO mode recommending screen is not displayed when printing a printing data item prepared by an application currently used.". Therefore, by checking the check boxes for these determination criteria, the user can avoid feeling the troublesomeness that the ECO mode recommending screen 40 is undesirably displayed when printing a printing data item prepared by a specified application.

The determination criterion "The ECO mode recommending screen is not displayed when a ruled line is present." is as follows. A method of extracting a ruled line present in a printing data item includes, for example, scanning the printing data item for a certain line in a primary scanning direction and then determining a length of contiguous black pixels that is not less than a threshold value, if it is detected, as a ruled line. Such a ruled line in a printing data item frequently forms part of a table. Because a printing data item containing a table is often a repetitive document or a document having a large number of numerals written small, almost all such cases are unsuited for ECO mode printing. Therefore, by checking the check box for this determination criterion, the user can avoid feeling the troublesomeness that the ECO mode recommending screen 40 is undesirably displayed when printing a printing data item having a ruled line.

The determination criterion "The above settings are applied to other printer drivers." is as follows. Usually, the determination criteria described above are established for each printer driver. However, it is expected that a small number of users want to change the determination criteria for each printer driver. Therefore, by checking the check box for this determination criterion, the user can avoid feeling the troublesomeness that the determination criteria need to be established for each printer driver because the determination criteria established for one printer driver can be applied to other printer drivers.

For each of individual user accounts, the storage section 212 stores therein determination criteria checked on the ECO display setting screen 80, key words registered on the key word registration screen 90, and other registration items. Therefore, even in cases where a plurality of users share a single information processing device 20, the settings of concern can be customized on a user-by-user basis and, hence, the determination section 214 is allowed to make determination under settings suited for each user. Alternatively, it is possible to cause the storage section 212 to store therein settings established in a guest account to be shared by a plurality of users.

Figure 9:
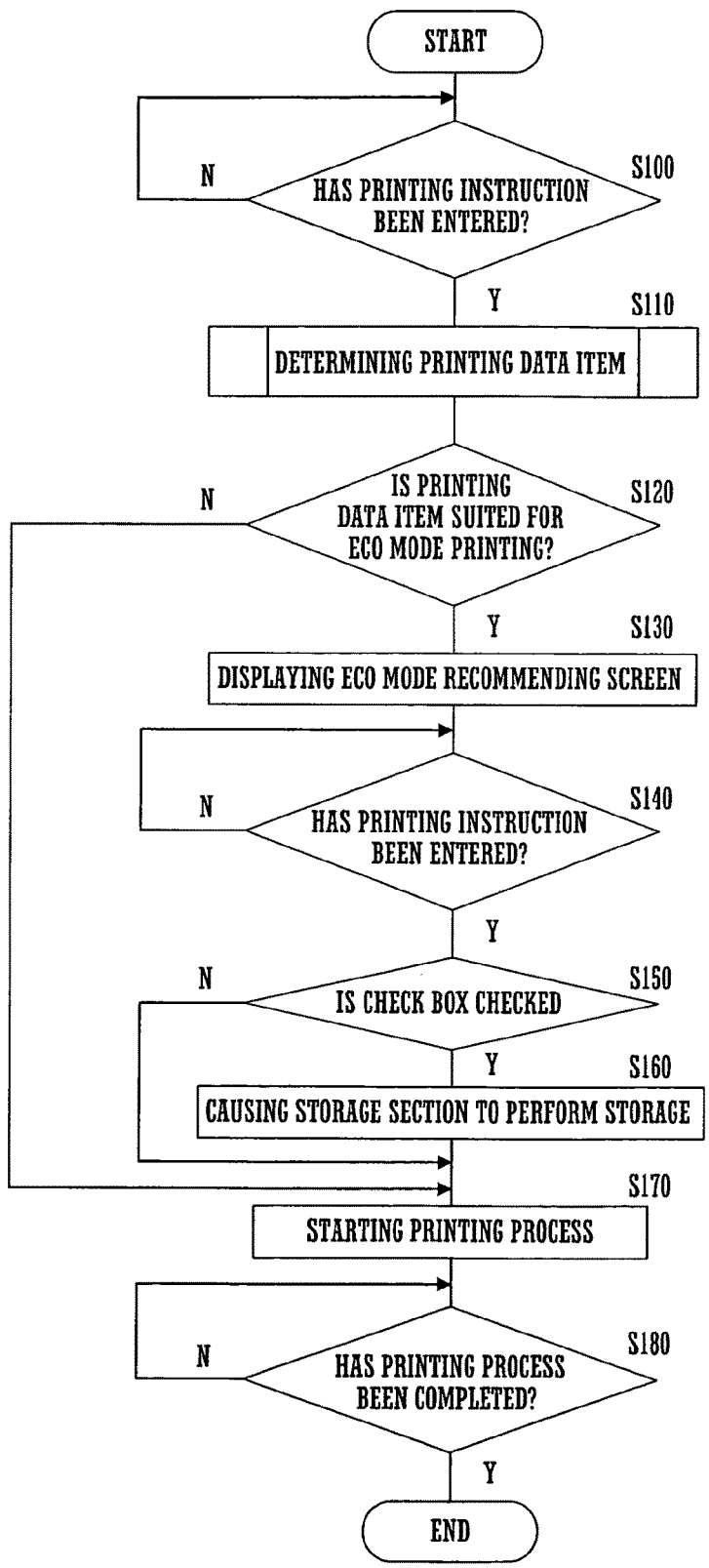
FIG. 9 is a flowchart of a control process carried out for printing a printing data item in a printing system according to a second embodiment of the present invention.

FIG. 9 is a flowchart of a control process carried out for printing a printing data item in a printing system according to a second embodiment of the present invention.

Figure 10:
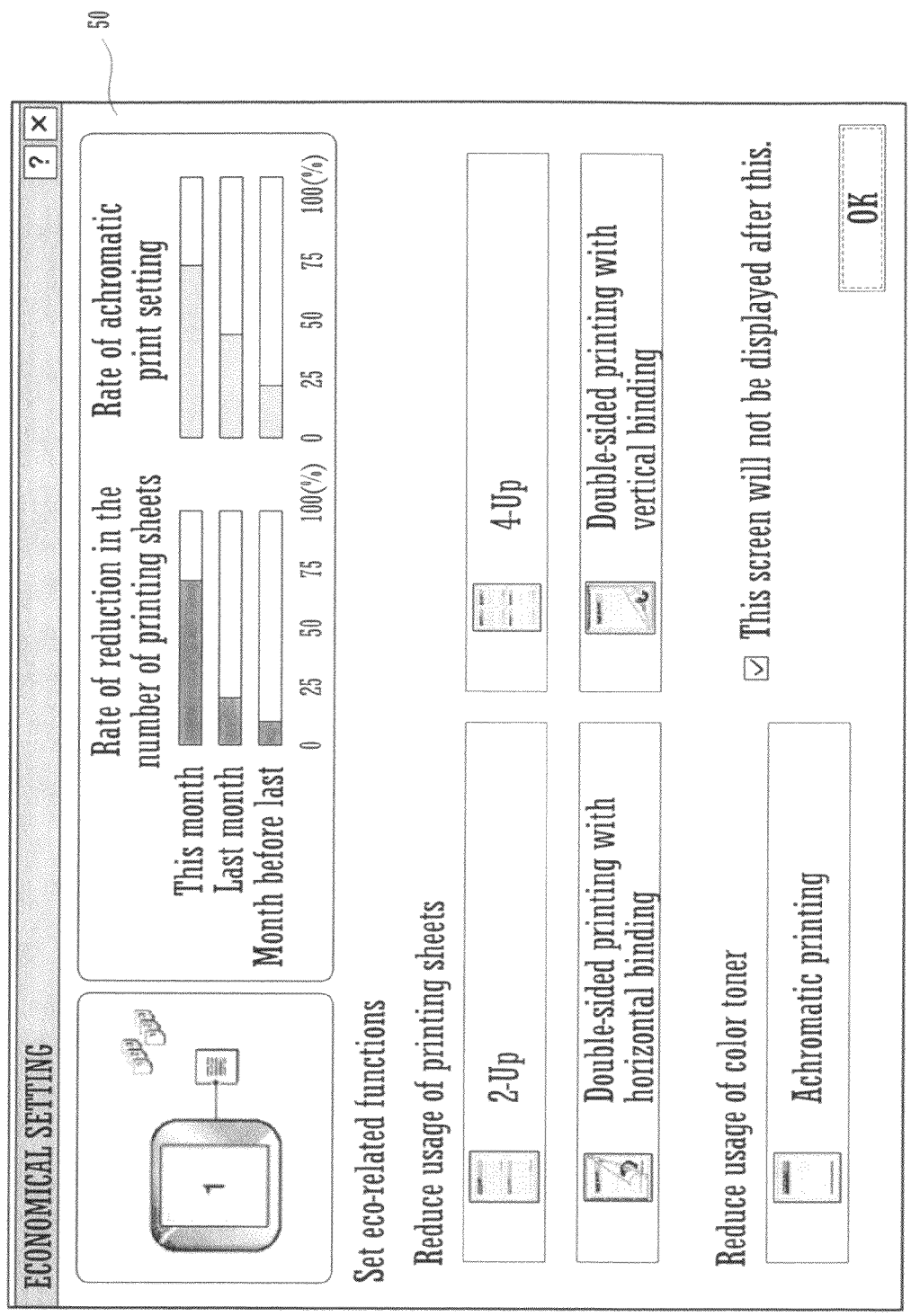
FIG. 10 is a view illustrating an ECO mode recommending screen displayed on a display section of the printing system according to the second embodiment of the present invention.

Description of control steps in this flowchart that are similar to the corresponding steps in the first embodiment will be omitted. According to the present embodiment, if the control section 211 determines that a printing data item specified by a printing instruction is suited for ECO mode printing (in the case of YES in step S120), an ECO mode recommending screen 50 as shown in FIG. 10 is displayed (step S130).

The ECO mode recommending screen 50 has a check box for preventing the ECO mode recommending screen from being displayed at the next-time printing occasion or its succeeding printing occasions. When a printing instruction is entered with this check box checked, the ECO mode recommending screen is not displayed at the next-time printing occasion or its succeeding printing occasions for a printing data item that is the same as or similar to the printing data item of concern.

Specifically, if the control section 211 determines that the check box on the ECO mode recommending screen 50 has been checked (in the case of YES in step S150) when a printing instruction is given, the control section 211 causes the storage section 212 to store therein a characteristic of the printing data item of concern (step S160). In printing a printing data item having the characteristic stored in the storage section 212 at the next-time printing occasion or its succeeding printing occasions, the determination section 214 determines that the printing data item of concern is unsuited for ECO mode printing.

Thus, even if a printing data item unsuited for ECO mode printing is erroneously determined to be suited for ECO mode printing, erroneous determination can be prevented thereafter by using the characteristic stored in the storage section 212 as a basis for determination in printing a printing data item that is the same as or similar to the printing data item for which the check box has been checked to prevent the ECO mode recommending screen 50 from being displayed at the next-time printing occasion or its succeeding printing occasions.

Figure 11:
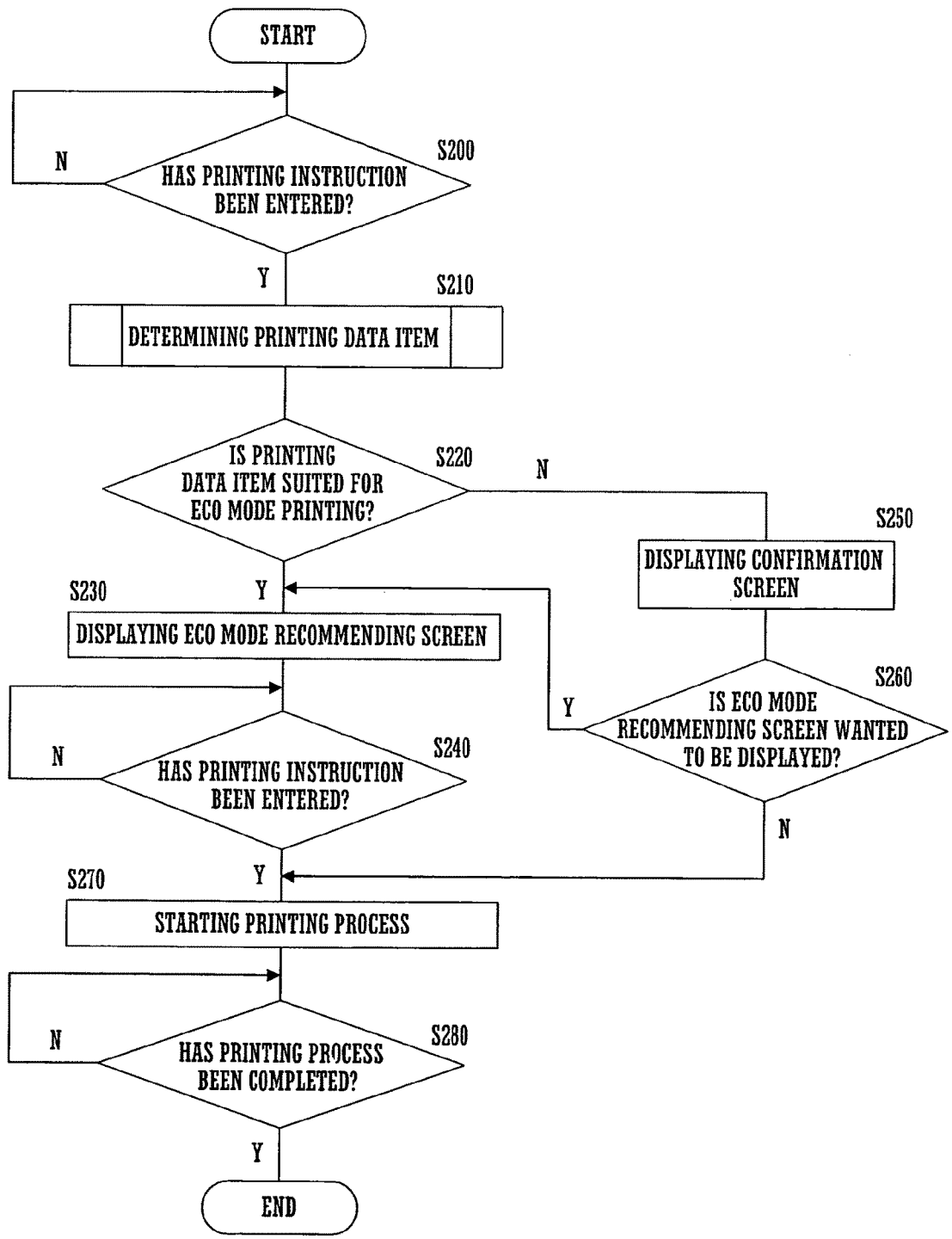
FIG. 11 is a flowchart of a control process carried out for printing a printing data item in a printing system according to a third embodiment of the present invention.

FIG. 11 is a flowchart of a control process carried out for printing a printing data item in a printing system according to a third embodiment of the present invention.

Figure 12:
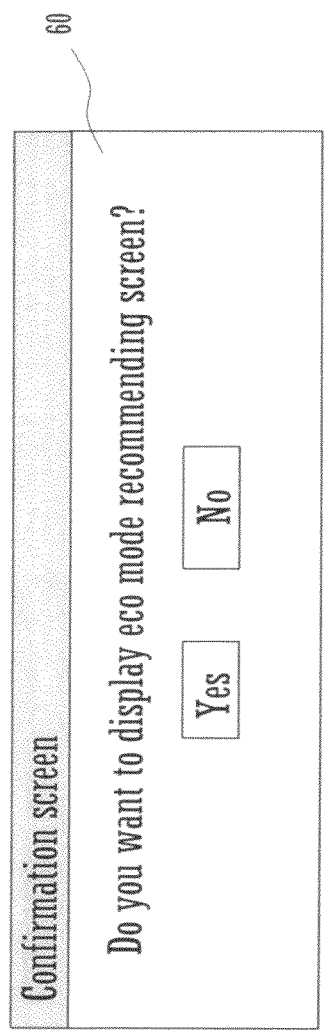
FIG. 12 is a view illustrating a confirmation screen displayed on a display section of the printing system according to the third embodiment of the present invention.

Description of control steps in this flowchart that are similar to the corresponding steps in the first embodiment will be omitted. According to the present embodiment, if the control section 211 determines that a printing data item specified by a printing instruction is unsuited for ECO mode printing (in the case of NO in step S220), a confirmation screen 60 as shown in FIG. 12 is displayed (step S250).

The confirmation screen 60 has options to display and not to display the ECO mode recommending screen. Therefore, even if the determination section 214 determines that the printing data item of concern is unsuited for ECO mode printing, the user himself or herself can again check whether or not the printing data item of concern is unsuited for ECO mode printing. If it is not determined by the control section 211 that the user wants to display the ECO mode recommending screen 40 (in the case of NO in step S260), the control section 211 starts a printing process immediately (step S270). On the other hand, if it is determined by the control section 211 that the user wants to display the ECO mode recommending screen 40 (in the case of YES in step S260), the control section 211 causes the ECO mode recommending screen 40 to be displayed (step S230).

Figure 13:
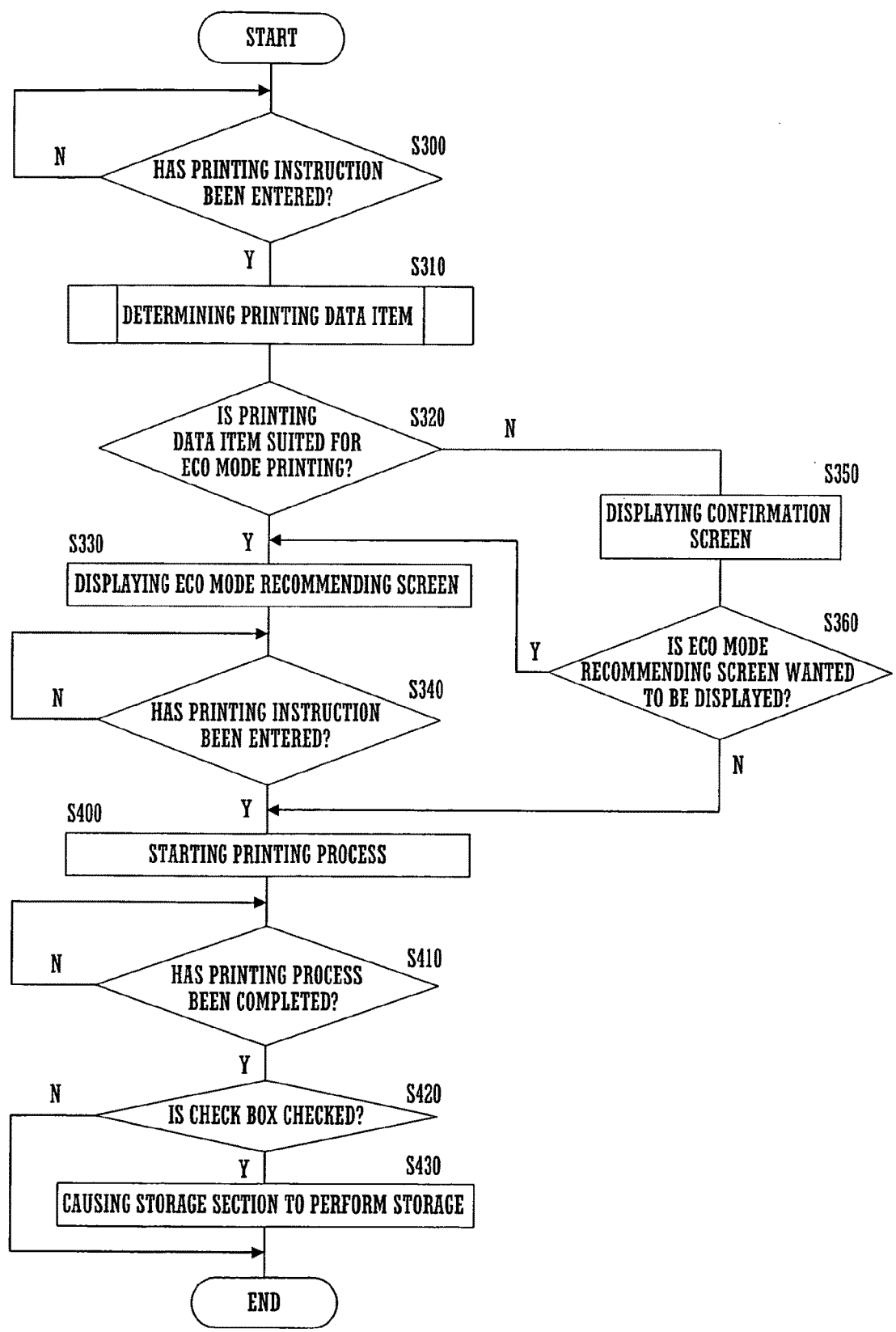
FIG. 13 is a flowchart of a control process carried out for printing a printing data item in a printing system according to a fourth embodiment of the present invention.

FIG. 13 is a flowchart of a control process carried out for printing a printing data item in a printing system according to a fourth embodiment of the present invention.

Figure 14:
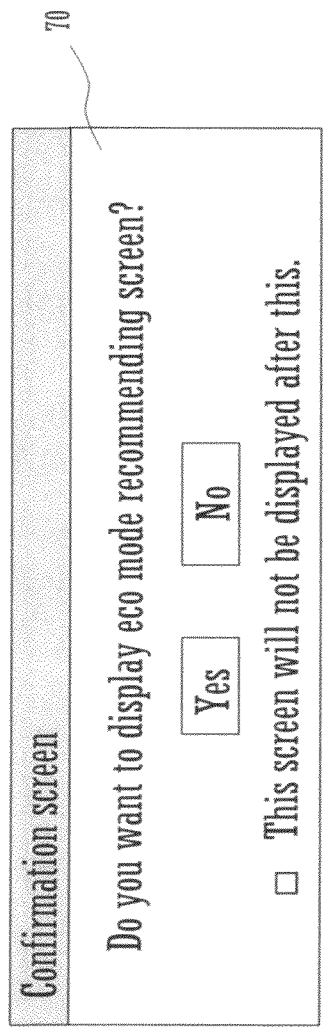
FIG. 14 is a view illustrating a confirmation screen displayed on a display section of the printing system according to the fourth embodiment of the present invention.

Description of control steps in this flowchart that are similar to the corresponding steps in the third embodiment will be omitted. According to the present embodiment, if the control section 211 determines that a printing data item specified by a printing instruction is unsuited for ECO mode printing (in the case of NO in step S320), a confirmation screen 70 as shown in FIG. 14 is displayed (step S350).

The confirmation screen 70 has, in addition to the options to display and not to display the ECO mode recommending screen, a check box for preventing the confirmation screen 70 from being displayed at the next-time printing occasion or its succeeding printing occasions. When a printing instruction is entered with this check box checked, the confirmation screen 70 is not displayed at the next-time printing occasion or its succeeding printing occasions for a printing data item that is the same as or similar to the printing data item of concern.

Specifically, if the control section 211 determines that the check box on the confirmation screen 70 has been checked (in the case of YES in step S420), the control section 211 causes the storage section 212 to store therein a characteristic of the printing data item of concern as well as the setting established for preventing the confirmation screen 70 from being displayed in printing a printing data item having the characteristic stored in the storage section 212 at the next-time printing occasion or its succeeding printing occasions (step S430). Accordingly, the control section 211 fails to cause the display 22 to display the confirmation screen 70 in printing a printing data item having the characteristic stored in the storage section 212 which prevents the confirmation screen 70 from being displayed at the next-time printing occasion or its succeeding printing occasions.

Checking the check box on the confirmation screen 70 by the user means that the user wants normal printing of a corresponding printing data item. Therefore, the user can be relieved from the troublesomeness that the confirmation screen is displayed for every printing data item wanted to be printed normally.

Figure 15:
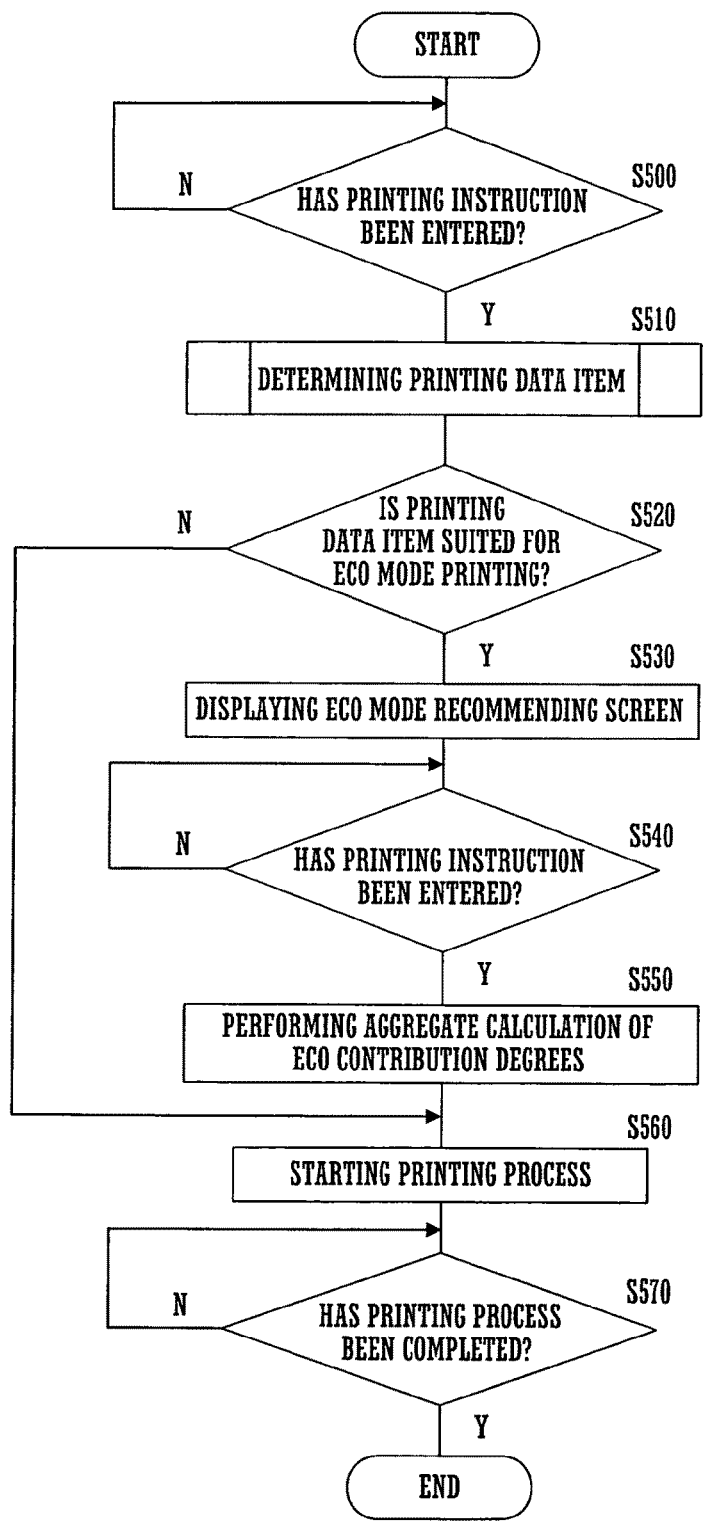
FIG. 15 is a flowchart of a control process carried out for printing a printing data item in a printing system according to a fifth embodiment of the present invention.
Figure 16:
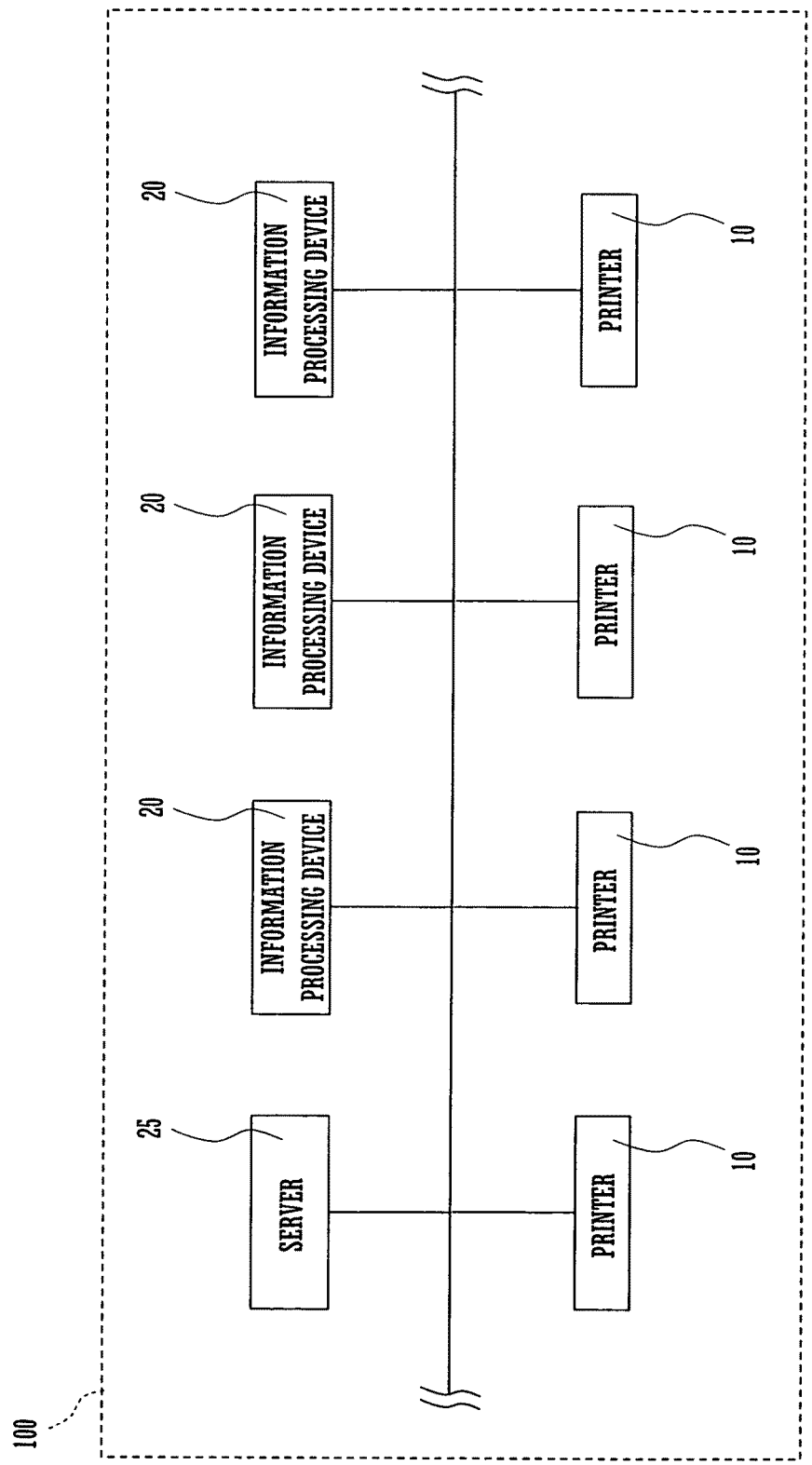
FIG. 16 is a diagram illustrating an exemplary printing system configuration according to any one of the first to fifth embodiments of the present invention.

FIG. 15 is a flowchart of a control process carried out for printing a printing data item in a printing system according to a fifth embodiment of the present invention.

Description of control steps in this flowchart that are similar to the corresponding control steps in the first embodiment will be omitted. According to the present embodiment, if it is determined by the control section 211 that a printing data item specified by a printing instruction is suited for ECO mode printing (in the case of YES in step S520), the management section 215 takes into account a rate of reduction in the amount of usage of printing media for the printing data item of concern in performing aggregate calculation of ECO contribution degrees (step S550). On the other hand, if it is determined by the control section 211 that the printing data item specified by the printing instruction is unsuited for ECO mode printing (in the case of NO in step S520), the printing process starts without the management section 215 taking into account a rate of reduction in the amount of usage of printing media for the printing data item of concern in performing aggregate calculation of ECO contribution degrees (step S560).

In managing the ECO contribution degrees on a user-by-user basis, if uniform management is done by which aggregate calculation of ECO contribution degrees is performed for all printing data items without taking the business circumstances of each user into consideration, users who often handle printing data items unsuited for ECO mode printing would be evaluated disadvantageously, thus resulting in unfair management.

By contrast, the present embodiment is capable of managing the ECO contribution degrees without imparting a sensation of unfairness to the users who often handle printing data items unsuited for ECO mode printing.

In any one of the first to fifth embodiments, it does not matter whether or not the printing system 100 forms a network. In cases where the printing system 100 does not form a network, the information processing device 20 is provided with the major components (i.e., control section 211, storage section 212, determination section 214, and management section 215) as shown in FIG. 1. In cases where the printing system 100 is composed of a plurality of printers 10, a plurality of information processing devices 20 and a server 25, which are connected through a network, the server 25 may be provided with the major components, instead of the information processing device 20. In such cases, a printing instruction given from a certain information processing device 20 is transmitted to a target printer 10 through the server 25.

In cases where the server 25 is provided with the major components, the storage section 212 of the server 25 stores therein the settings shown in FIG. 7 as connected with the ID of each information processing device 20. In cases where the printing system 100 forms a network, the information processing devices 20 are usually managed on a user-by-user basis. Therefore, the determination section 214 can make determination under settings suited for each user.

The foregoing embodiments are illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. A printing system having a plurality of ecological modes indicative of printing sheet saving modes (ECO modes) each provided for printing with a reduced amount of usage of at least one of printing media indicative of printing sheet, printing toner and ink, the printing system comprising:

a display section capable of displaying an ECO mode recommending screen which recommends the plurality of ECO modes for selection;

a storage section configured to store therein a characteristic of a printing data item unsuited for ECO mode printing;

a determination section configured to determine whether or not a printing data item is suited for the ECO mode printing based on information stored in the storage section; and a control section configured to control the printing system based on a result of determination made by the determination section, wherein the control section causes the display section to display the ECO mode recommending screen in response to a determination made by the determination section that the printing data item is suited for the ECO mode printing and then starts a printing process in response to a printing instruction given by a user, while, in response to a determination made by the determination section that the printing data item is unsuited for the ECO mode printing, starting the printing process without the display section displaying the ECO mode recommending screen;

the display section displays a check box on the ECO mode recommending screen for preventing the ECO mode recommending screen from being displayed at a next-time printing occasion or its succeeding printing occasions; and when the printing instruction is given by the user with the check box checked, the control section causes the storage section to store therein a characteristic of a printing data item specified by the printing instruction as the printing data item unsuited for the ECO mode printing.

2. The printing system according to claim 1, wherein when the determination section determines that the printing data item is unsuited for the ECO mode printing, the control section causes the display section to display a confirmation screen having options to display and not to display the ECO mode recommending screen instead of causing the display section to display the ECO mode recommending screen.

3. The printing system according to claim 2, wherein:

the display section displays a check box on the confirmation screen for preventing the confirmation screen from being displayed at a next-time printing occasion or its succeeding printing occasions; and when the printing instruction is given by the user with the check box checked, the control section performs a control such that the storage section is caused to store therein a characteristic of a printing data item specified by the printing instruction as well as information on a fact that a setting has been established for preventing the confirmation screen from being displayed in printing a printing data item having the characteristic stored in the storage section at a next-time printing occasion or its succeeding printing occasions, whereas, in response to a printing instruction given by the user at the next-time printing occasion or its succeeding printing occasions, the display section fails to display the confirmation screen when the determination section has determined that the printing data item specified by the printing instruction is a printing data item preventing the confirmation screen from being displayed.

4. The printing system according to claim 1, further comprising a management section configured to manage an ECO contribution degree indicative of a rate of reduction in the amount of usage of the printing media at a printing occasion on a user-by-user basis, wherein in printing a printing data item determined by the determination section to be suited for the ECO mode printing, the management section takes into account a rate of reduction in the amount of usage of the printing media for the printing data item in performing aggregate calculation of ECO contribution degrees, while, in printing a printing data item determined by the determination section to be unsuited for the ECO mode printing, the management section fails to take into account a rate of reduction in the amount of usage of the printing media for the printing data item in performing aggregate calculation of ECO contribution degrees.

5. The printing system according to claim 1, which includes a plurality of printers, a plurality of information processing devices, and a server, wherein:

the plurality of information processing devices each have the display section;

the server has the storage section, the determination section and the control section; and when a printing instruction is given by a user, the control section causes the display section of an information processing device receiving the printing instruction from the user to display the ECO mode recommending screen in response to a determination made by the determination section that a printing data item specified by the printing instruction is suited for the ECO mode printing; and the plurality of printers, the plurality of information processing devices and the server are connected to a network.

* * * * *